Figure 8:
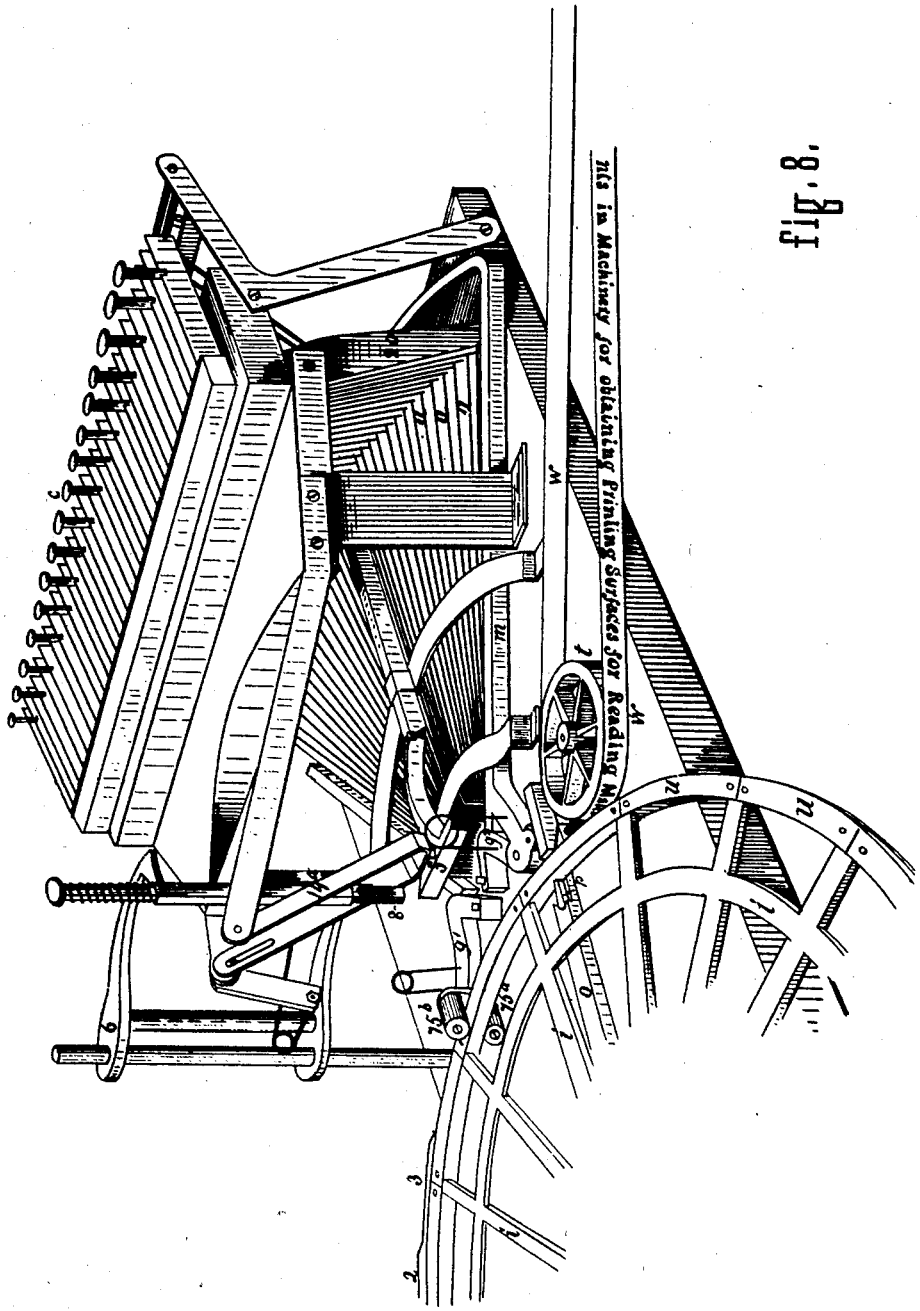

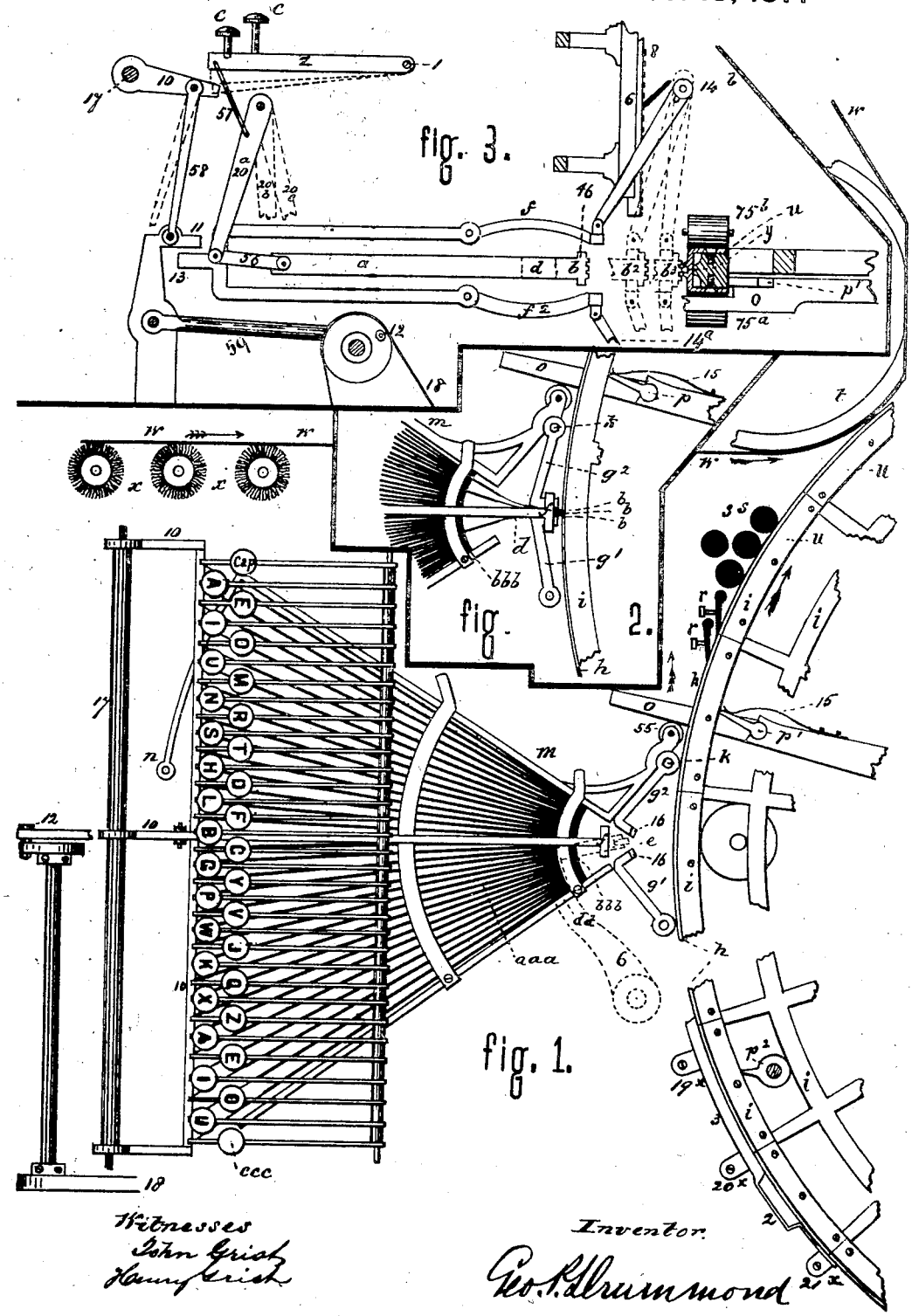
G. P. DRUMMOND.
Process and Apparatus for Producing Printing Surfaces
No. 198,237. Patented Dec. 18, 1877
5 Sheets—Sheet 1.

G. P. DRUMMOND.
Process and Apparatus for Producing Printing Surfaces.
No. 198,237. Patented Dec. 18, 1877.
5 Sheets—Sheet 2.
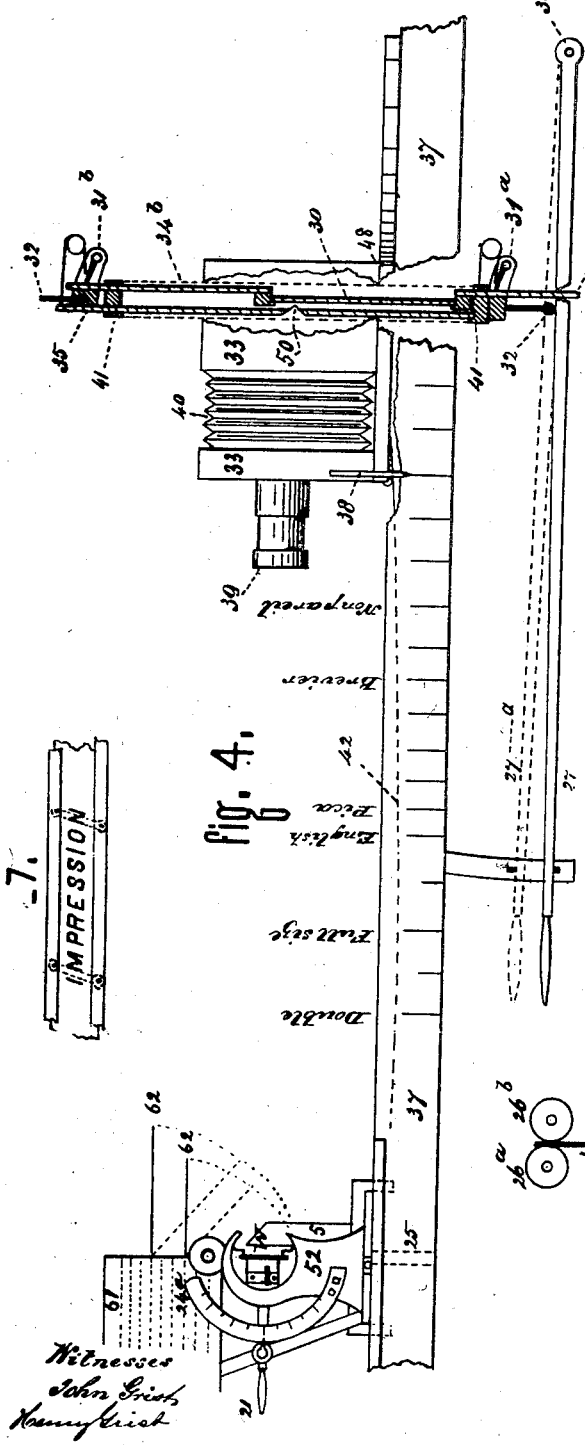
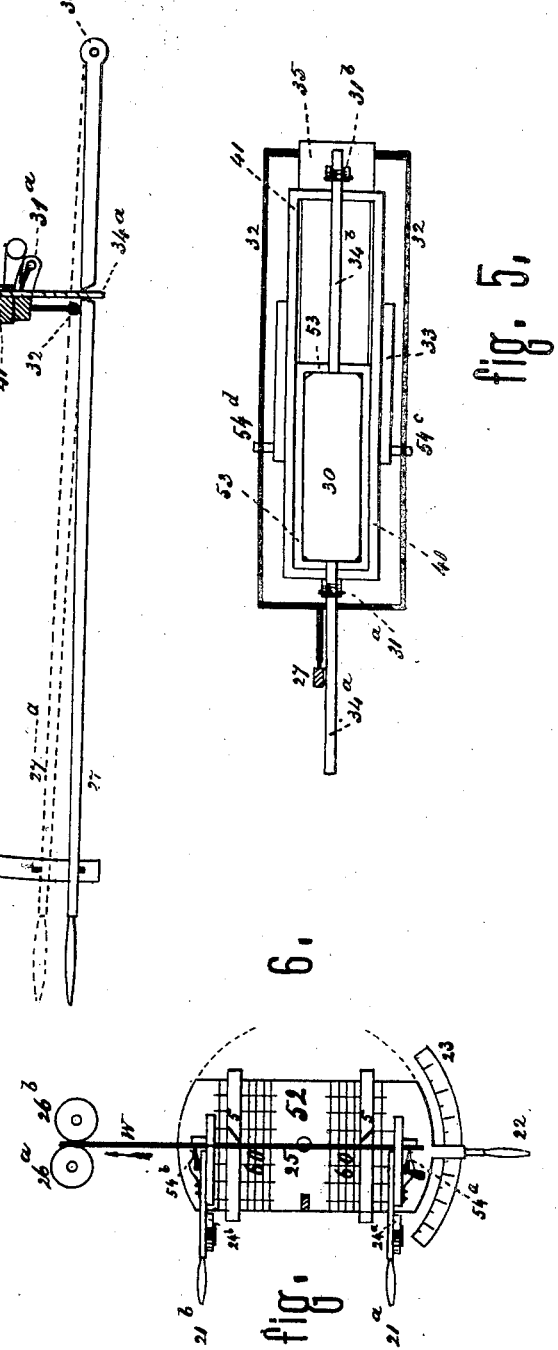

G. P. DRUMMOND.
Process and Apparatus for Producing Printing Surfaces.
No. 198,237. Patented Dec. 18, 1877.
Details
*Numbers*
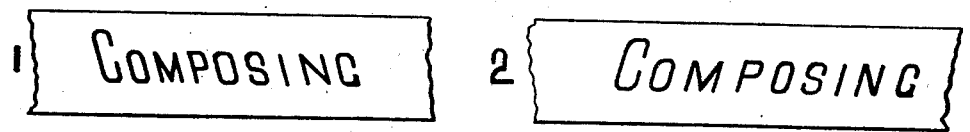
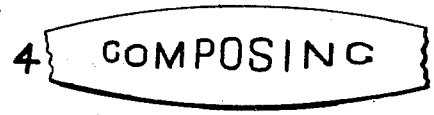
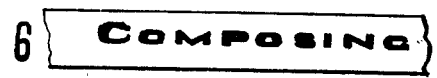
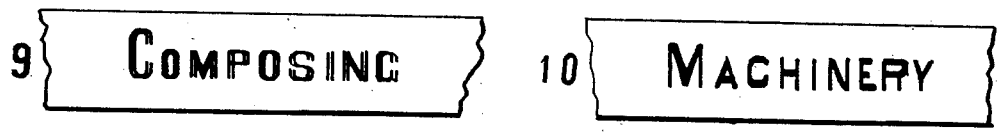
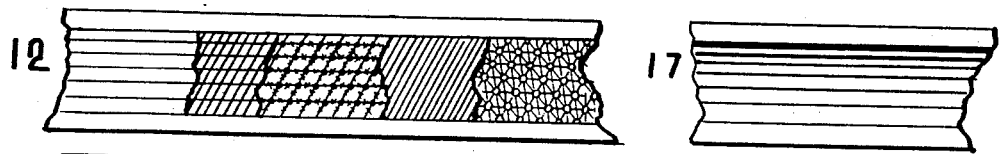
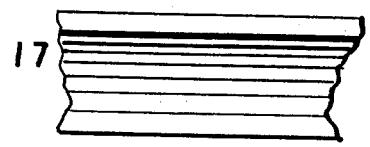
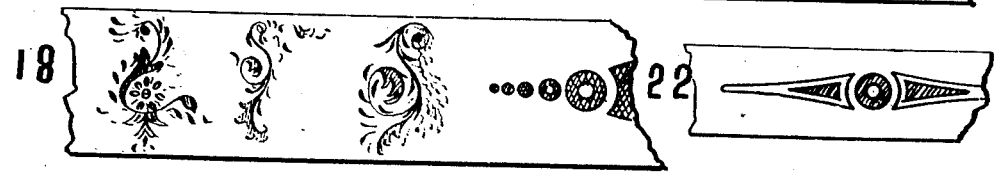
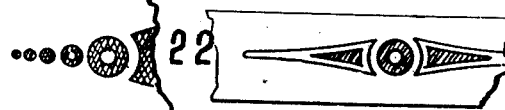
Witnesses.
John Grist
Henry Grist
Inventor
Geo. P. Drummond G. P. DRUMMOND.
Process and Apparatus for Producing Printing Surfaces.
No. 198,237. Patented Dec. 18, 1877.

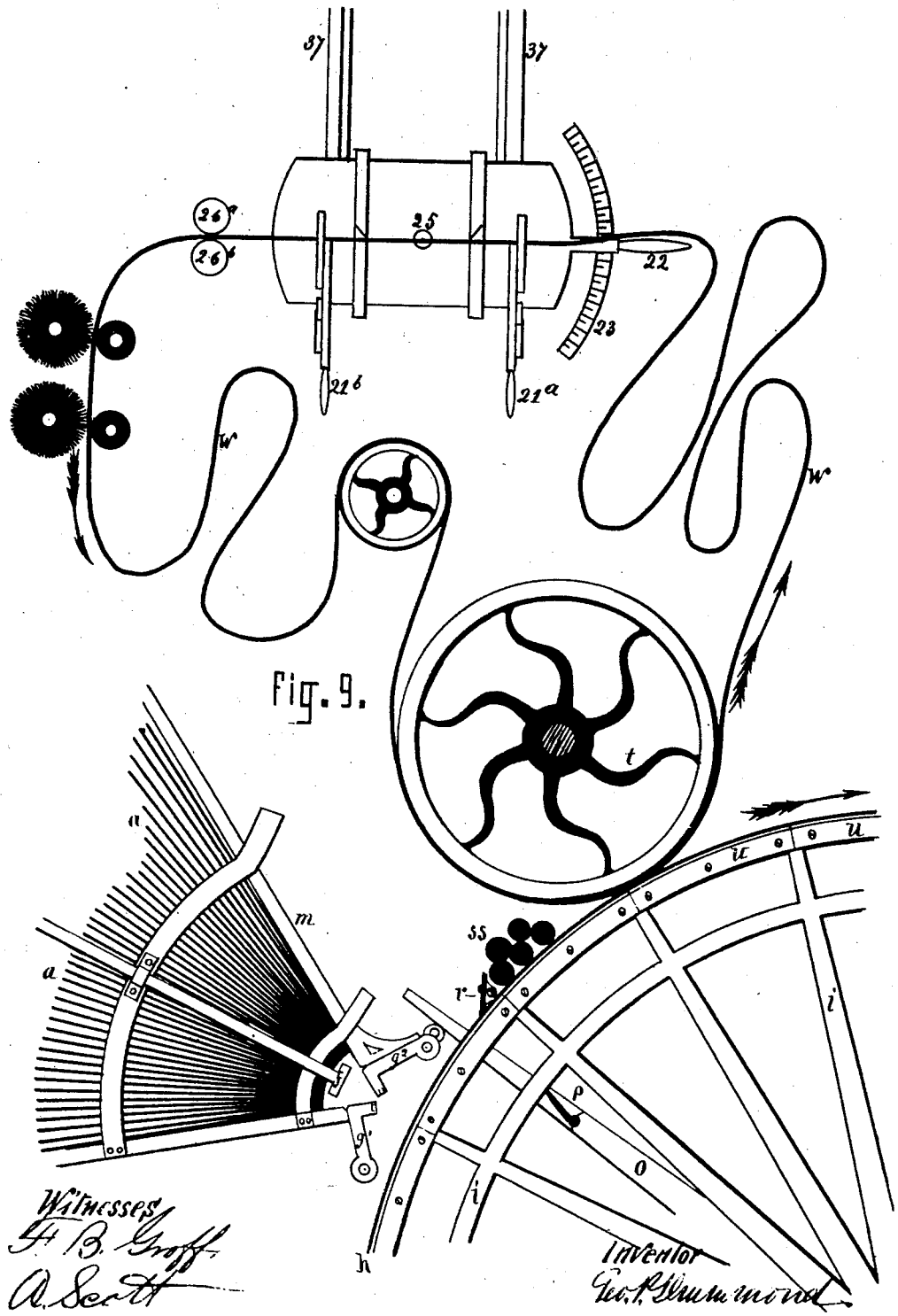

UNITED STATES PATENT OFFICE.

GEORGE P. DRUMMOND, OF OTTAWA, ONTARIO, CANADA.

IMPROVEMENT IN PROCESSES AND APPARATUS FOR PRODUCING PRINTING-SURFACES.

Specification forming part of Letters Patent No. 198,237, dated December 18, 1877; application filed December 27, 1876.

CASE No. 1.

*To all whom it may concern:*

Be it known that I, GEORGE PRINGLE DRUMMOND, of the city of Ottawa, in the county of Carleton, in the Province of Ontario and Dominion of Canada, have invented new and useful Improvements in the Art of Producing Printing-Surfaces for Reading-Matter, and the machinery therefor, which are fully set forth in the following specification, reference being had to the accompanying drawings, in all of which like figures or letters of reference indicate like parts.

The object of my invention is to produce the various sizes of letter-press, and also displayed and fancy printing, or reading-matter of any printed kind, in large or small lettering, complete and "justified," without the aid of fonts of type or type-setting, and in a more rapid manner than now accomplished by these means to prepare metal or other surfaces or lithographic stones for the press, from which surfaces newspapers, (letter-press or advertisement,) book, and other reading-matter may be printed.

The manner in which this is accomplished may be primarily and briefly described thus: In a machine having fingering-keys, representing the letters of the alphabet, punctuation-points, and figures, any required reading-matter is composed and printed, directly or indirectly, on a movable rubber or other elastic surface, preferably in the form of an endless white or whitened india-rubber band. This band, as it issues from the printing-machine, is passed before a photographic camera, and the reading-matter thereon, being first "justified" by straining or stretching to suitable lengths of lines, is photographed line by line, or lines in succession, on the sensitized surface in the camera, by means of an opening, repeating, and self-adjusting exposure-slide. The photographed plate or surface thus produced is then transferred to metal or other printing-surfaces or lithographic stones by any known process of photo-mechanical printing.

To produce any desired size of letters or type, either uniform as a whole or in a mingled variety, the camera is simply moved on a suitable way or track, forward to or backward from the object reading-matter on the elastic band, the correct focus through the lens being quickly obtained each time by a recorded scale. This variety may be further enlarged by contorting the elastic band backward or forward, up or down, or by canting it backward or forward, or turning it sidewise, producing elongated letters, vertical or horizontal, or Italicized, canted, bulged, stunted, diminishing, and other varieties of letters or type; but, still further, by the use of screens, or by any fanciful designs in black, white, or transparent lines, placed over the object reading-matter, artistic appearances in black or white linings or scorings are given to the lettering while in process of photographing, and this may be further diversified by the introduction of scrolls, breaks, letter ornamentations, line pictures, borders, either alternately or in connection with the successive lines as they are photographed; and thus a great variety of printing or letters or type may be produced from even one elementary set, or, at most, a very few varieties of type.

Referring to the accompanying drawings, Figure 1, Sheet 1, is a plan view of the type-printing mechanism while at rest, and shows the keys, marked with the various letters of the alphabet, the vowels of which, it will be observed, are duplicated and placed together in two sets, one set at either end of the key-board. $a\ a\ a$ are type-rods connected with the keys $c\ c\ c$. To these type-rods are attached the type $b\ b\ b$, by spring-joints at $d$, and it will be observed that all these type and their connecting-rods converge upon a center at $e$. Any type which has been driven forward to this center by depressing its key is here caught by the united action of the nipper-clamps (cross-head) $f$, and the guiding-clamps $g^1\ g^2$, and, as may be seen in Fig. 2, driven forward, and its form is impressed upon a leaden or soft-metal rim, $h$, secured to the transferring-wheel $i$. Guiding-clamp $g^1$ has a fixed center-pin, but guiding-clamp $g^2$, at its center $k$, is attached to the movable arm $m$, centered at $n$. By a spring the lever $o$ is held against the friction-roller 55, attached to the arm $m$ and guiding-clamp $g^2$. This lever has the knee-joint (friction-cam) $p^1$, and works upon the central shaft of the transferring-wheel *i*. When one, two, three, or more types are driven between the guiding-clamps, guiding-clamp $g^2$ gives way in the direction of the arrow, and, acting upon the lever *o* and knee-joint $p^1$, by their aid, moves the transferring-wheel *i* forward the exact distance required to receive the impression, as seen in Fig. 2. *r r* are cutters or planes for smoothing and leveling the impression, and may be stationary, but are worked independent of the machine by a short reciprocating motion. *s s s* are inking-rollers for inking the impression. *t* is the printing cylinder or wheel. *w w w* is the elastic band, and *x x* are the revolving cleaning-brushes (Fig. 1 is here broken in upon by Fig. 2) to remove the printing (dead matter) from the band for a continuation of the printing. 2 is a cup of molten lead, heated by a gas-jet, and 3 is a concentric molding-form for remolding the soft-metal rim *h*. The driving-pulley and the belt 18, together with the shaft and crank 12, are shown detached from the machine. In this figure and the two succeeding ones the frame-work of the machine and all the journal-bearings are left out for more clearness. $p^2$ is a check friction knee-joint or cam, secured to the frame of the machine, to prevent any return movement of the transferring-wheel *i*.

Fig. 2, same sheet, shows the type-heads *b b b*. Three are shown in this instance, which have been moved forward by the keys, and, owing to the pliability of the spring-joints *d*, brought at right angles radially to the transferring-wheel *i*, under the united action of the nipper-clamps *f* and the guiding-clamps $g^1$ and $g^2$.

Fig. 3, same sheet, is an elevation, showing a side view of the nipper-clamps *f* and $f^2$ and one of the type-heads *b*, and the connecting mechanism with the keys *c c*, and shows how, by depressing a key, the type-rod *a* and its connected type-head *b* are moved forward a certain distance to $b^2$, and how, when at this position, the key-lever *z* comes in connection with or down upon the buffer-lever rod 10, underlying all the keys, (see Fig. 1,) and depresses it, and how this action brings the rapidly-reciprocating buffer 11, attached to the rapidly-revolving crank 12, to strike upon the buffer end 13 of the nipper-clamps $f f^2$, driving them forward. Swung from the center $14^a$ and $14^b$, these nipper-clamps close in upon the projected type-head and drive it forward. Their connection with the guiding-clamps, (aforedescribed in Figs. 1 and 2,) it will be readily perceived, is for the purpose of steadying the type-head *b*, and making the necessary heavy impression. The transferring-wheel *i* (section) is movable up or down under the action of the rollers $75^a$ $75^b$, connected with a treadle or lever, so as to receive impressions from either of the three (or there may be more) sets of type on the end of the type-heads *b b*. One is a set of the ordinary small letters, the second set are capital letters, and the third set figures, punctuation-points, and other signs.

Figs. 4, 5, and 6, Sheet 2, show the mechanism for carrying and adjusting the elastic band after it has received the impression of the subject-matter, and for justifying, contorting, and shaping this subject-matter as desirable during the process of photographing. They also show the camera and the mechanism and scales for rapidly focusing the subject-matter at any size of printing or type, and at the same time opening up the exposure-slide, and adjusting and moving up the sensitized plate, as each line of the subject-matter is displayed, to receive that corresponding size of printing or type. But these figures and their details I explain more fully in their proper place.

I will now proceed with a description of the operation of the printing-machine and the various contrivances required to carry out the whole process, and will commence with the operation of the fingering-keys. It will be observed that, as before stated, there are two sets of the vowels, one at either end. These are thus placed to enable the operator to increase the rapidity of printing the subject-matter upon the elastic band. Thus, if he finds the letters of any word he may be printing, or adjoining letters of any portion of that word, succeed one another on the keys from his left hand toward his right hand, he may strike as many letters of the word at one stroke as will answer this. For instance, the letters "o r t h" in " worth," or "i n d w" in "windward," are examples of four letters, and may all be struck at once, because these letters succeed one another on the keys from the operator's left hand to his right hand. "i n s" and "e r t" in "insert" are examples of three at a stroke, two strokes being all that is necessary for six letters. "i n t - e n t - i o n"—nine letters—is got by three strokes, and "u n d - e r s t - a n d"—ten letters—by three strokes also. "o p - e n - i n g" shows an example of two at a stroke.

These few examples will show that by this arrangement of the letters upon the keys, together with the increasing contrivances of the machine, the composing ability of the operator is at any rate doubled, and probably more so, as there are few words in the language which cannot be thus divided up more or less.

I may note here that by making the machine to move the transferring-wheel in the opposite direction, the operator may select his succeeding letters from his right hand to his left; but I have adopted left to right as the natural and conventional order of reading-matter. The first row of keys is made lower than the back row, to prevent contact when any of the back row are depressed. To obtain an impression of any letter upon the transferring-wheel *i*, I depress the key marked with that letter, and this brings the type-rod and its connected type-head forward to position $b^2$, Fig. 3. Having accomplished this, the base of the key-lever *z* now comes down upon the buffer-rod 10, underlying all the keys, Fig. 1, and this moves down the rapidly-reciprocating buffer 11, so that it immediately strikes the buffer end 13 of the nipper-clamps $f f^2$ and drives them forward. Being swung by the arms $14^a$ $14^b$, they close upon the type-head and strike the projecting lips 16 of the guiding-clamps $g^1$ $g^2$, and the projecting sides 46 of the type-head, and carry the whole forward with the necessary force to secure a good impression. The type-head is thus securely clamped on its four sides, and carried firmly forward at right angles (radially) against the transferring-wheel.

It will be observed from Fig. 2, and understood from prior description, that a number of type-heads can be driven forward at once, the flexible joints admitting of their being brought to a radial position in relation to the transferring-wheel $i$. As before explained, the guiding-clamp $g^2$, being movable outward, (centered at $n$,) adapts itself to one or more type-heads, as may be driven forward, and this outward movement produces an equal movement upon the transferring-wheel $i$, through the instrumentality of the lever $o$ and the knee-joint $p^1$. This knee-joint is similar in principle to the motive mechanism of feed-wheels in some sewing-machines. It gripes the wheel only on the outer movement. The wheel $i$ is thus moved forward a space equal to the number of type-heads to be impressed upon it; whether one or more, or whether broad or narrow letters, as i's or w's, or capitals, the space or movement of the wheel is precisely equal to the respective thicknesses thereof. The impression thus received upon the lead or soft-metal rim of the transferring-wheel, either in relief or intaglio, is by no means clear and sharp in its edges, and it is therefore necessary to plane the face of the impression, so as to sharpen its outline. This is accomplished by the small surface reciprocating cutters or planes $r$ $r$, already described.

The soft-metal rim $h$ also requires to be supported as close as possible to its outer face by the sides of the dovetail groove $y$, Fig. 3, to prevent its spreading. After being planed the impression is then ready for inking, which is accomplished by the rollers $s$ $s$ $s$, the outer one making a reciprocating motion over the inner ones, to distribute the ink from the platen. The impression thus made and inked is now transferred to the elastic band $w$ $w$, which passes over the printing cylinder or wheel $t$, and between it and the transferring-wheel $i$. The elastic band, thus printed with the subject-matter, is now passed through the shaping and adjusting frame, Figs. 4 and 6, of the photographic apparatus; but between this and where it leaves the printing-wheel it is run into slack, which is for the purpose of allowing the operator, who is justifying or shaping and photographing the impression, free scope in his work. As the band is photographed it is returned to the printing-wheel between the revolving brushes $x$ $x$. There, with diluted lye or other suitable wash on the brushes, and a dry brush and cloth, (the latter occasionally replaced to remove dampness,) the band is made ready for a continuation of the printing, by cleaning and removing the used impression, (dead matter.) The band is preferably endless.

Here I remark, after the impressed metal rim $h$ on the transferring-wheel has delivered the impression on the elastic band, it passes the cup of molten lead or other suitable metal in use, 2, which, by melting it, obliterates the impression, and the new rim is formed under the molding concentric groove 3. The molten metal (kept in this state by a gas-jet) also supplies any slight deficiency in material caused by waste (oxidization) or the action of the planes. Thus the soft-metal rim is completed for a continuation of the impressions of the type of the composing-machine. It will be noticed that the dovetail groove for the soft-metal rims is made in a series of casing-sections, $u$ $u$, or tire around the transferring-wheel. The purpose of this is to allow facility in melting, which would be difficult were the groove in the large body of solid metal forming the wheel; it also saves any undue expansion.

I would here observe that the elastic band may have the subject-matter printed directly upon it by placing it around the transferring-wheel in room of or over the soft-metal rim; but I have found that it is difficult to ink the type properly and make good clear impressions on the band without seriously affecting the rapidity of the machine; whereas, while the punches may be operated at any speed obtainable under the most practiced operator, the impression is transferred to the elastic band by the usual firm, steady pressure essential to a good impression. I may state, however, that by using inked ribbon under the type, and a movable platen, the impression may be received upon paper placed upon the platen and under the inked ribbon, thus serving as a type-writing machine; and as this possesses many advantages over those now in use, I make this the subject of a separate application.

As appears in Fig. 3, and before explained, the type-heads of the machine embrace three sets of type, but may easily be made to embrace more. The central row is small letters, the lower row capitals, and the upper row figures, punctuation-points, abbreviations, &c. The figures may be used in combination either with the small letters or capitals; but owing to the latter being on the same type-head, and of a similar thickness as its attendant small letter, the capitals can only be used by themselves in capital-letter printing. To substitute capitals, therefore, which will be of appropriate sizes to the small letters, and may be used in conjunction, I have placed the vertical bar 8, having on its edge facing the transferring-wheel a set of capital letters. Where each of these letters occurs, the bar is of an equal thickness to the letter; for instance, where a "w" or an "m" occurs, that place is considerably thicker than where the "i" is. When I require a capital letter I depress this vertical bar until I bring the desired capital opposite the soft-metal rim of the transferring-wheel. I then depress the lever 10 by the key-cap, and the impression is instantly given. When I require a space, I depress the space-key at the other end of the key-board, and give the transferring-wheel a flat depression. The capital-letter adjunct will be readily understood from Fig. 8.

I have thus explained the working of the type-printing machine with its several details, the manner in which the subject-matter is composed and stamped upon soft metal, how it is then transferred to the elastic band, how that band is passed to the photographing-machine, and again returned and cleaned for a continuation of the printing, and how the soft-metal rim is melted and remolded.

I will now proceed with an explanation of the manner of photographing the subject-matter for transference to stone or metal surfaces for printing.

Fig. 4 is a side elevation of the photographing, justifying, and shaping mechanism. 33 is the camera, showing a section of the dark shield 41 and the mechanism for raising the sensitized plate 30 contained within it, a line at a time, and the manner in which the slot or longitudinal exposure-opening 50 is at the same moment, a line at a time, made. It also shows how, when it is desired to take various sizes of printing, the camera is moved to or from the subject-matter $w$, according to a recorded scale on the way or track, and how the varying-lever 27 raises the slide 35 and the sensitized plate 30, and makes an exposure-opening at 50, corresponding with the size of the type or printing required, and the set-scale on the side of the track or way. 61 is a case containing the screens, slides, and ornamentations, mentioned already. 37 is the track or way, having a register of various sizes of type on the side; 52, the adjusting and shaping machine, (end view;) and $w$, the elastic band.

Fig. 5 shows the back view of the camera-box 33, and the dark shield 41, with its door removed, in order to show the interior. 30 is the sensitized plate in the frame 53, which is movable within the dark shield 41. To the frame 53, containing the sensitized plate, are attached two guiding-bars, $34^a$ $34^b$, passing through either end (top and bottom) of the dark slide, and continued through knee-joint $31^a$ $31^b$, also at either end. These knee-joints operate in principle like the knee-joint of the transferring-wheel already explained. 35 is the opening exposure-slide, parting at 50, Fig. 4. 27 is a section of the varying-lever. (Seen in Fig. 4.) 32 is an iron frame, moving in guides at $54^c$ $54^d$, and is attached at its top to the opening exposure-slide 35, and its lower end is just over the lever 27. When this lever is raised it raises the iron frame 32, the attached opening exposure-slide 35, and its attached knee-joint $31^b$. The latter gripes the bar $34^b$ of the sensitized-plate frame 53 only in the movement upward. Therefore the exposure-opening 50, and the raising of an equal portion of the sensitized plate to receive the photographed impression, are made simultaneously.

Let it be here understood that when the operator has given sufficient exposure to the sensitized plate—that is, has photographed the line of the subject-matter before him—he lowers the lever, which lowers the slide and closes the exposure-opening; but the sensitized plate remains stationary, because it is held in any position it attains by the under or lower knee-joint $31^a$. The operator then moves forward the elastic band carrying the subject-matter, adjusts it, raises the lever 27 to $a$, as shown in dotted lines, and photographs the next line. Of course the sensitized plate 30 is moved up another line equally with the exposure-opening 50, and always remains in the position it is left, through the instrumentality of the friction knee-joints $31^a$ $31^b$; but the slide drops back and closes the exposure-opening each time. In this way the operation of photographing the subject-matter is repeated, line after line, until the whole sensitized plate is filled, when another is substituted, and the frame being shoved to the bottom the operation is repeated as before.

Fig. 6 shows a plan view of the shaping-frame and adjusting mechanism for the elastic band. $w$ is the elastic band printed with the subject-matter. $26^a$ $26^b$ are two weighted draft or drawing rollers for carrying the elastic band through the machine in the direction of the arrow. $54^a$ $54^b$ are two knee friction-joints, acting exactly in principle to those both in the camera and the printing-machine, already explained, and operate in conjunction upon the elastic band, thus: The subject-matter to be photographed is passed to knee-joint $54^b$, and may be strained back toward knee-joint $54^a$ to justify it to any word or conventional break. The latter knee-joint will retain it in position during process of photographing. 60 is a scale for measuring the various lengths of lines, and having pointer-shields 5 5, between which they may be justified according to the distance of the camera from the object reading-matter, and also to suit any other length of line or size of lettering. The handle 22, for moving the shaping-frame by the scale 23 and on the center 25, is for turning the elastic band $w$ at various angles to the camera. The handles $21^a$ $21^b$ and scales $24^a$ and $24^b$ (see also Fig. 4) are for turning or canting the subject-matter at various angles to the camera, but in a different plane.

The mode of operation of this mechanism will now be more fully explained.

The subject-matter which is printed upon the elastic band is of one description of type.

Ordinary great primer may be conventionally used; but I place no limit upon the size. Whatever size is used, however, in the type-machine, that size must form a basis or standard size, from which to mark all the scales of sizes on the photographing machinery. Of course other sizes of subject-matter may be easily interloped, with additional suitable scales added to the machine, or the operator may acquire sufficient skill by practice to interlope or mingle various sizes in the object reading-matter without reference to the permanent scales of the machine. Except, however, for a certain class of lettering, little used, the scope of the machine, with its various shaping and increasing and diminishing contrivances, will afford a variety of style and size sufficient for all ordinary printing.

But to continue. The elastic band, having been printed with the subject-matter, is passed through the shaping and justifying machine, Fig. 6, and through the feeding-rollers 26$^a$ 26$^b$, and the knee-joints 54$^a$ 54$^b$ hold the band, as already explained.

We will now suppose the operator wishes to print the page of a book or column of a newspaper in diamond lettering or type. He sets the gages 5 5 to suit the length of the line on the shaping and adjusting machine, as at Fig. 6. He then adjusts the focus of the camera by placing the forward pointer or stop 38 against diamond on the scale of the way or track 37, and the back pointer or stop 48 against diamond or its representative number, letter, or mark, (these may be used as substitutes,) in place of the actual names of different sizes of type on the short track. He now justifies his lines where he finds it necessary. To do so he allows the elastic band $w$ to run through until the beginning of the reading-matter reaches the off gage-point or scale, Fig. 6. The knee-joint 54$^b$ now holds the off end of the elastic band while he draws back on it until he brings the reading-matter to any desired or conventional break or line ending at the near gage-point. In all ordinary justification of lines a very slight strained movement of the elastic band will be sufficient. The justification of his line being now complete, he raises the lever 27, Figs. 4 and 5. This raises the exposure-slide 35, and the exposure-opening at 50 will be opened to a width corresponding with unleaded diamond lines. The line is then photographed. As explained before, the exposure-slide drops and closes the exposure-opening when the lever is dropped; but the sensitized plate remains stationary, being held by knee-joint 31$^a$. Thus the first line is photographed. Then, to commence operations for the next, the operator raises knee-joint 54$^a$ on shaping and adjusting frame, and allows the feed-rollers to carry the band forward until he brings his last photographed line ending just past the off gage-point. He then justifies the subject-matter, as before, by drawing backward, raises the lever, and photographs the second line, and so repeats and proceeds until he has filled up his plate or completed his page, which he has now in uniform diamond printing. In the same manner, to obtain pica, for instance, he moves the camera forward until the pointer reaches pica on the scale, and he moves the bellows-frame, with sensitized-plate slide, back till its position reaches pica on its scale. He then widens the scale on the adjusting frame to pica, starts his subject reading-matter, (the elastic band,) and proceeds as before, until the sensitized plate is completed with pica-sized reading-matter.

It may be observed here that as the camera is moved forward the scope or swing of the raising-lever 27, Fig. 4, is increased, as it has its center or fulcrum at 36. Therefore, with the pointers at pica on the camera-tracks, the lever gives a pica exposure-opening upon the sensitized plate, while with the pointers at diamond, or nearer the fulcrum of the lever, a suitable, and, of course, narrower, exposure-opening is made. In this manner any other sizes are obtained, the adjustment being readily and rapidly secured.

It will, of course, be readily understood that mingling a number of different sizes of letters in lines on the same plate is simply done by moving the camera backward from, or forward to, the subject-matter on the elastic band. This gives a style suitable for advertisements, displayed matter, headings, &c. Some of the subject-matter for this style may be printed in capitals, and some in ordinary lettering, and this, in a mixture of sizes, gives a further diversity of appearance—usual in advertisements. Letters may even be obtained by this process almost microscopic, but, at any rate, smaller than from ordinary type.

Having thus described the manner in which all ordinary plain matter, (lettering,) large and small, is obtained, I now proceed to describe the various contrivances for producing fancy and other varieties of lettering.

It will be observed that I place above the shaping and adjusting frame a frame or box, which contains as great a variety of screens, ornamental designs and figures, breaks, bars, and capital-letter and other ornaments, and other fancy material, in white, black, or transparent linings on glass, as I may deem necessary for the proper execution of the art. These, it will be noticed from Fig. 4, are placed in slides, so that they can be readily pulled out and dropped over the subject-matter during the process of photographing, and incorporated therewith on the sensitized plate, either in connection or between the lines, as seen in details 12 and 22, Sheet 3; and I obtain or produce a further diversity of lettering upon the sensitized plate by the following devices and movements of the shaping-frame: The handle 22, Fig. 6, is attached to the frame, so that it may be moved on a vertical axis, 25, at any angle to the camera. The effect produced by this upon the lettering, when transferred to the sensitized plate, will be somewhat varied by different lenses; but the general result will be to shorten the line, and make the lettering appear elongated vertically, also slightly diminished toward the farthest end.

The handles $21^a$ $21^b$, Figs. 4 and 6, are attached to the sides of the movable center blocks, through which the elastic band passes, so that the band may be moved at any angle to the camera on a horizontal axis. The effect produced by moving these handles so as to bring the band (subject-matter) at an angle to the camera is to produce the appearance of stunted letters on the sensitized plate, or, in other words, letters elongated horizontally. These letters would show all their vertical lines thick, and their horizontal lines thin. Moved on a vertical axis, as described, immediately preceding, the vertical lines would be thin and the horizontal lines thick, or the opposite.

By a short, sharp, quick reciprocating movement of the shaping-frame, letters are produced upon the sensitized plate having the appearance of shaded letters—that is, two impressions are taken or produced in close proximity, as in details 9 and 10, Sheet 3.

In the same manner, by a shorter reciprocating movement, letters are taken or produced which have broader proportions than those on the elastic band. By turning lever $21^b$ downward or upward, while lever $21^a$ remains stationary, the lettering produced on the sensitized plate will diminish from large at one end of the line to small at the other, and vice versa if the positions of the lever-handles are reversed, as in details 5 and 7, Sheet 3. This operation, as may be seen, throws one end of the subject-matter (the elastic band) at an angle, obtuse or acute, to the camera, while the other end retains a full front.

By turning the handles in opposite directions, the lettering will be produced large in center of line and tapering to both ends, as in details 4, Sheet 3. The impression on the sensitized plate may be further contorted by curving the subject-matter (the elastic band) upward or downward, or by bulging it to or from the camera, the results of which will be readily understood.

By using the canting-frame, Fig. 7, and moving the upper bar thereof either backward or forward, the letters of the subject-matter are canted either backward or forward, thus producing Italicized letters on the sensitized plate. Italicizing letters may also be effected by turning the subject-matter at an angle to the camera, said angle being produced by a combination of the handles of the shaping-frame, moved to angles on a vertical and horizontal axis, respectively, as in details 1 and 2, Sheet 3.

Wire or glass screens or ornaments painted white show corresponding white scorings or lines over the lettering; painted black they duplicate themselves upon the lettering. It is evident that the shaping of the lettering may be increased; but figurings, ornamentations, and screens may be multiplied indefinitely, and line-drawings, wood-cuts, &c., in unending variety, may be incorporated together, made and produced by this process during the operation of photographing.

I may also add the following additional explanations: Buffer-lever 10, guiding-clamps $g^1$ $g^2$, nipper-clamps $f f^2$, arm $m$, type-heads $b\, b\, b$, and the key-connections are all understood to be returned to position by springs which have been left out of drawings for more clearness.

The type-wheel $i$ may be of wood and the impression obliterated by cutters, the gradually-diminishing diameter of the wheel being compensated for by its being movable under spring-pressure against the type-heads.

All the machinery connected with the type-wheel $i$ moves with it in its triplication movement.

By placing the melting-chamber at the center $e$, and the type-impression metal kept in a fluid state, the impressions may be made clear without the aid of cutters, but much more slowly; or, in lieu of either metal or wood, wax softened by heat may be used in the rim of the type-wheel $i$ for receiving the impression, which, when cool, will be of ample hardness to print the elastic band.

The details in Sheet 3 of the drawings show other contortions of the elastic band and various shapings of the lettering besides those already referred to when transmitted to the sensitized plate.

These are, of course, only a few examples of what may be done in the manipulation of the elastic band, and are given rather that the process may be more thoroughly explained than as a complete result. Details Nos. 1 and 2, for instance, are produced by moving the top and bottom of the elastic band in opposite directions; and the same result may be accomplished by making a combination movement of the handles of the shaping-frame, as follows: Handle 22, Fig. 6, turned to or from the camera, and handles $21^a$ $21^b$ turned up or down from a level position. No. 3 is the result of the band bulged upward, and No. 4, bulged forward; Nos. 5 and 7, the band vertical at one end and canted at the other; No. 6, the band canted on a horizontal axis and strained; No. 8, the band turned upon a vertical axis, which gives the appearance of tall lettering, having thin vertical lines and thick horizontal ones. No. 6 unstrained would give a reversed appearance to the lettering, contrasted with No. 8. The letters would be long horizontally, with thick vertical lines. No. 9 is a duplication of vertical lines obtained by a lateral reciprocating motion given to the shaping-frame. No. 10 is a duplication or thickening of the horizontal lines by an up-and-down movement of the shaping-frame; No. 11, the band stretched. Nos. 12 to 17, inclusive, are various designs for screens, to drop over lines during the process of photographing. Nos. 18 to 22, inclusive, are examples of ornamentations, &c., to be used for capitals, divisions, paragraphs, &c. Nos. 12 to 22, inclusive, may be painted on glass, or may be, when convenient, of open-work, such as obtainable in wire-gauze, netting, &c. If black in color, they are duplicated over the letters they cover; if white, they leave similar white scorings on the lettering.

Fig. 8, Sheet 4, is a perspective view of the type-printing mechanism, in which $a\ a$ are the type-rods; $b\ b$, the type; $g^1\ g^2$, the guiding-clamps; $f$, the upper nipper-clamp; $i$, the transferring-wheel; $o$, the radial lever; $p$, the friction-cam or knee-joint. $75^a\ 75^b$ are the guiding-rollers for triplicating the range of the keys. 8 is the capital-letter bar, and 6 is its frame. 2 is the melting-cup; 3, the molding-groove; $u\ u\ u$, the casing or tire segments, and $w$ the elastic band.

In Fig. 4 two screens, 62, are shown drawn out of the box 61. They only hinge downward when drawn out to their fullest extent, and are dropped in the direction of the dotted lines. The lengths of these screen-slides from their hinges to their fronts are exactly the same as their respective distances from their points of exit in the box to the lower edge of the elastic band, so that all drop to the same position as regards their lower edges.

The following is a description of the secondary way or track 42, Fig. 4:

It has been explained, in making the different sizes of lettering upon the sensitized plate by moving the camera backward or forward upon the way or track, that the opening exposure at 50 increases in width as the camera approaches the subject-matter. Now, in ordinary photographing it will be known that, if the operator moves the camera in a straight line toward the object, the representation of the object increases equally upward as well as downward upon the sensitized plate. But here this would not answer, as when I either photograph a succession of lines of the same size of lettering, or, more especially, when I mix up different sizes of lettering by moving the camera backward or forward upon the track, I must invariably, and without fail, make the exposure-cutting, or the upper outline of each exposure, coincide exactly with the lower outline of each preceding exposure; and to accomplish this I must always keep the base-line of the longest letters of the subject-matter upon the elastic band, the lens of the camera, the lower edge of the opening exposure, and the base-line of the focused representation upon the sensitized plate, in a straight and direct line, no matter what position the camera may occupy upon the way or track 37. This is done by the secondary way or track 42. The head of the camera rests and runs upon this track, which is placed in such a manner that it keeps the lens always at the proper elevation, and always elects the straight and direct line already referred to. The result is that each exposure-outline is cut up to and adjoining the outline of the exposure immediately preceding.

I may state that in the type-printing device the type-letters may be either in relief or depressed. They are preferably the latter, as they form raised letters upon the soft-metal rim, and print off on the elastic band more readily; but if made in relief, forming upon the soft-metal rim depressed letters, then wipers would be added to the machine to remove the surface ink, and the impression would be received upon the elastic band after the manner of copper-plate printing.

Fig. 9 of the drawings, Sheet 5, gives a plan view of portions of the several mechanisms and elements combined, heretofore described in detail, and which constitute the apparatus as a whole employed in carrying out my invention.

I do not herein claim a type-bar having two or more sets of type thereon and an associated vibrating platen; but,

Having now fully described my said invention, and clearly explained its operation, what I do claim as new is—

1. The improvement in the art of producing surfaces for printing reading or other matter from, which consists in first impressing, printing, or otherwise placing, by means of a type writing, printing, or attaching mechanism, the subject-matter on an elastic band or surface, then photographing, and afterward transferring the same by any photo-mechanical process to metal, stone, or other surfaces for printing, substantially as described.

2. The improvement in the art of producing surfaces for printing reading-matter from, in reference to the justification thereof, which consists in straining an elastic band or surface having the subject-matter thereon, so as to elongate the said subject-matter within certain limits or lengths of lines, according to conventional practices among printers; and, secondly, to contract or elongate the said subject-matter by turning the elastic band or surface upon which it is placed to any desired angle in the same plane with the camera, then photographing, and afterward transferring the same by any photo-mechanical process to metal, stone, or other surfaces for printing, substantially as described.

3. The improvement in the art of producing surfaces for printing reading-matter from, which consists in contorting, angling, stretching, or straining, in the same or different planes with the camera, an elastic band or surface having the subject-matter thereon, so as to impart varieties of shapes and designs to the lettering, which is then photographed, and afterward, by any photo-mechanical process, transferred to metal, stone, or other surfaces for printing, substantially as described.

4. The improvement in the art of producing surfaces for printing reading-matter from, which consists in placing over or alongside the elastic band carrying the subject-matter any screens, letter ornamentation, or designs, whether black, white, or transparent, or by intervening between the lines of the subject-matter as they are photographed any ornamentations, pictures, or designs, which combinations are then photographed, and afterward, by any photo-mechanical process, transferred to metal, stone, or other surfaces for printing, substantially as described.

5. The improvement in the art of producing surfaces for printing reading-matter from, which consists in obtaining various sizes of lettering, intermingled or otherwise, on the same negative plate, by increasing or decreasing the distances between the sensitized plate in the camera and the subject-matter placed on an elastic band or surface in a uniform size, which photographed negative is afterward transferred to metal, stone, or other surfaces for printing, substantially as described.

6. The improvement in the art of producing surfaces for printing reading-matter from, consisting of the combination of a band or surface of any elastic material, having thereon the subject-matter, with a mechanism for adjusting and shaping it, movable as a whole upon a central and vertical axis, and, in that part through which the continuing line of subject-matter is horizontally passed, upon a horizontal axis, by means of which movements the subject-matter may be readily presented at a variety of angles to the sensitized surface in the camera, in the manner substantially as described, and for the purposes specified.

7. The improvement in the art of producing surfaces for printing reading-matter from, consisting in the employment of an adjusting machine or mechanism operating an elastic band or surface having the subject-matter thereon, in combination with a photographic camera, substantially as described, and for the purpose of reproduction of such subject-matter by any photo-mechanical means.

8. The method of obtaining surfaces for printing reading-matter from, by means of an elastic band or surface having the subject-matter thereon, in combination with a photographic camera having a guiding way or track and an adjusting and shaping mechanism attached thereto, substantially as described, and for the purposes specified.

9. The employment, in the art of producing printing-surfaces, of a photographic camera, in combination with an inscribed or recorded set-scale, or detailed list of the various sizes of type, upon its own guideway or focusing-track, and a corresponding and proportionately inscribed or recorded scale or detailed list of the various sizes of type upon the guiding way or track, connecting with the shaping and adjusting mechanism, for the purpose of readily increasing or diminishing and focusing, and thereby obtaining variable sizes of printing from the object reading-matter placed on an elastic band or surface in an elementary or standard size by a type printing, writing, or attaching machine or mechanism, whether the object reading-matter be treated fancifully or be plain, all as set forth and described.

10. The employment, in the art of producing printing-surfaces, of an elastic band or surface having the subject-matter thereon, and subsequently passed through an adjusting and shaping mechanism, substantially as described, in combination with a photographic camera, and a secondary guide way or track, for raising the front or back of the camera, so as to keep the base-line of the subject-matter on the elastic band, the focused lens, and the base-line of the opening exposure-slide on the sensitized plate all in one direct and straight line, whatever position the camera may occupy on the main track, or whether the lettering be focused large or small upon the sensitized plate, substantially as described.

11. The employment, in the art of producing surfaces for printing reading-matter from, of an elastic band or surface having the subject-matter thereon, and subsequently passed through an adjusting and shaping mechanism, in combination with a photographic camera, substantially as described, and an exposure-slide in the plate-shield of the camera, giving, at whatever position the camera may occupy in relation to the subject-matter to be reproduced, a width of opening exposure suitable to the height of the lettering as focused upon the sensitized plate, substantially as described.

12. The employment, in the art of producing surfaces for printing reading-matter from, of an elastic band or surface having the subject-matter thereon, and subsequently passed through an adjusting and shaping mechanism, in combination with a photographic camera, substantially as described, and a sensitized-plate frame within the sensitized-plate shield of the camera, movable at each exposure equally and uniformly with, and to a similar width of line as, the opening exposure-slide, but remaining stationary at each shutting of the opening exposure-slide, substantially as described.

13. The elastic band or surface $w$, having the subject-matter thereon, combined with the feeding-rollers $26^a$ $26^b$, and the shaping and adjusting mechanism 52, substantially as described, and for the purposes specified.

14. The elastic band or surface $w$, having the subject-matter thereon, combined with the knee-joints or holding-cams $54^a$ $54^b$, substantially as described, and for the purposes specified.

15. The elastic band or surface $w$, having the subject-matter thereon, combined with the lever 22 and its scale 23, also with the levers $21^a$ and $21^b$, and their scales $24^a$ $24^b$, substantially as described, and for the purposes specified.

16. The combination of the shaping and adjusting mechanism 52 and the way or track 37 with a recorded register of type sizes thereon, and with the camera 33, having a recorded register of type sizes thereon, substantially as described, and for the purposes set forth.

17. The combination of the varying-lever 27, the opening exposure-slide 35, and the iron frame 32, connecting both, substantially as described, and for the purposes specified.

18. The combination of the opening exposure-slide 35, operating the knee-joints or friction-cams $31^a$ $31^b$ on the friction-bars $34^a$ $34^b$, with the frame 53, to which the latter are attached, and its contained sensitized plate 30, substantially as described, and for the purposes specified.

19. The combination of the elastic band $w$, the camera 33, the opening exposure 50, and the movable sensitized plate 30, all as substantially described, and for the purposes specified.

20. The combination of pointers 38 and 48 on the camera with their respective scales or registers of type sizes, substantially as described, for the purposes of obtaining various sizes of lettering and the correct focus thereof.

21. The elastic band $w$, having the subject-matter thereon, the pointer-shields 5 5, and the recorded scale 60, substantially as described, and for the purposes of justification and making various lengths of lines.

22. The combination of the holding-box 61, the adjustable ornamental screens, fancy lettering, and other slides 62, and the elastic band $w$, having the subject-matter thereon, substantially as described, and for the purposes specified.

23. The combination of the secondary track 42, the elastic band $w$, having the subject-matter thereon, and the lens 39, with the base of the opening exposure, substantially as described, and for the purposes specified.

24. The combination of the tracks 42 and 37 with the camera 33, substantially as described, and for the purposes specified.

25. In an apparatus for printing, photographing, and transferring reading or other matter from, for the production of surfaces to print from, combined and arranged to operate as described, a composing, printing, and transferring machine having fingering-keys operating type of soft or hard metal or letter representations of the various letters of the alphabet, punctuation-points, figures, and all other signs necessary for the production of reading-matter of any kind, substantially as described, by means of which reading-matter can be rapidly composed, and transferred or printed directly or indirectly upon a band or surface of any elastic material—if directly, by the aid of an inking-roller upon the surface of the elementary type; if indirectly, by the intervention of the impression on lead, wood, or other material, in relief or intaglio—which received impression may be transferred to the elastic band or surface by the ordinary process of inking-rollers and pressure.

26. The combination of the keys $c$ $c$, the type-rods $a$ $a$ $a$, the arms 20, and the connecting-rods 56 and 57, substantially as described, and for the purposes specified.

27. The combination of the keys $c$ $c$ and their attached arms $z$ $z$ with the buffer-rod 10 and the buffer 11, by their connecting-rod 58, substantially as described, and for the purposes specified.

28. The combination of the rapidly-revolving crank 12, the connecting-rod 59, and the buffer 11, substantially as described, and for the purpose specified.

29. The rapidly-reciprocating buffer 11, operating upon and in combination with the nipper cross-heads $f$ $f^2$ and their closing-arms $14^a$ $14^b$, substantially as described, and for the purpose specified.

30. The combination and connection of the type-rods $a$ $a$ $a$, the type-heads $b$ $b$ $b$, the pliable spring-joints $d$ $d$ $d$, and the guiding-clamps $g^1$ $g^2$, substantially as described, and for the purposes specified.

31. The combination of the type-heads $b$ $b$ $b$ and their connected type-rods $a$ $a$ $a$, converging upon a central point, $e$, but, by spring-joints $d$ $d$, making their impression at a distance beyond that point, for the purposes substantially set forth and specified.

32. The nipper cross-heads $f$ $f^2$, the stationary center guiding-clamp $g^1$, and the movable center guiding-clamp $g^2$, all combined with and operating upon the type-heads $b$ $b$ $b$, when driven forward to position $b^2$, substantially as described, and for the purposes specified.

33. With one or more type-heads driven between guiding-clamps $g^1$ and $g^2$, the combination of the guiding-clamp $g^2$, the radial arm $o$, and its attached friction knee-joint $p$, held to position by the spring 15, substantially as described, and for the purposes specified.

34. The combination of the type-heads $b$ $b$, having the type thereon in relief or intaglio, with the inserted lead or soft-metal rim or band $h$, attached to the wheel $i$, substantially as described, and for the purposes specified.

35. The combination of the lead or soft-metal rim $h$, the lipped groove $y$, in which it is inserted, substantially as set forth and described, and for the purposes specified.

36. The combination of the impressed lead or soft-metal rim $h$, the cutters and smoothers $r$ $r$, and the inking-rollers $s$ $s$, substantially as described, and for the purposes specified.

37. The elastic band $w$, with the subject-matter printed thereon, in combination with cleaning-brushes $x$ $x$, substantially as described, and for the purposes specified.

38. The combination of the type-wheel $i$, the bearing-rollers $75^a$ $75^b$, and two, three, or more sets of type on the type-heads $b$ $b$ $b$, substantially as described, and for the purposes specified.

39. The combination of the lead or soft-metal rim $h$, impressed with the subject-matter, the cup of melted metal 2, and the remolding-groove 3, substantially as described, and for the purposes specified.

40. The combination of the soft-metal rim $h$, the cup of melted metal 2, and the casing or tire segments $u$ $u$, substantially as described, and for the purposes specified.

41. The combination of a capital-letter bar, 8, and its frame 6, with the guiding-clamps $g^1$ $g^2$ and the nipper cross-head clamps $f\ f^2$, substantially as described, and for the purpose of securing a steady forward stroke.

42. The combination of the capital-letter bar 8 with the transferring-wheel $i$ and the inserted soft-metal rim $h$, substantially as described, and for the purpose specified.

43. The combination of the capital-letter bar 8 with the converging type-heads $b\ b\ b$ and the inserted soft-metal rim $h$, substantially as described, and for the purpose specified.

In testimony that I claim the foregoing I have hereunto set my hand this 10th day of November, 1876.

GEORGE PRINGLE DRUMMOND.

Witnesses:
JOHN GRIST,
HENRY GRIST.